United States Patent [19]
Boege

[11] 3,898,837
[45] Aug. 12, 1975

[54] METHOD OF AND DEVICE FOR THE IDENTIFICATION AND REDUCTION OF PEAKS IN CHROMATOGRAMS

[76] Inventor: Dietrich A. H. Boege, Santisblick 18, Daisendorf, 7758, Germany

[22] Filed: Sept. 17, 1973

[21] Appl. No.: 397,907

[30] Foreign Application Priority Data
Sept. 19, 1972  Germany............................ 2245815

[52] U.S. Cl. ................................................ 73/23.1
[51] Int. Cl. ........................................... G01n 31/08
[58] Field of Search .......... 73/23.1, 23; 235/151.35; 23/232 E, 254 E, 255 E, 232 C

[56] References Cited
UNITED STATES PATENTS

| | | | |
|---|---|---|---|
| 3,069,895 | 12/1962 | Burk | 73/23.1 |
| 3,306,096 | 2/1967 | Hana et al. | 73/23.1 |
| 3,318,149 | 5/1967 | Varadi | 73/23.1 |
| 3,559,455 | 2/1971 | Karasek | 73/23.1 |
| 3,717,028 | 2/1973 | Annino et al. | 73/23.1 |

*Primary Examiner*—Richard C. Queisser
*Assistant Examiner*—Stephen A. Kreitman
*Attorney, Agent, or Firm*—S. A. Giarratana; F. L. Masselle; J. K. Conant

[57] ABSTRACT

In measuring the signal peaks caused by unknown samples in, for example, the detector outputs of gas chromatographs, the peak signals are identified as to the unknown sample components by comparing their time of occurrence (the retention times of the sample components) to the times of occurrence of known components from a previously run known sample. The peak signals are then integrated to find their areas and each peak area is multiplied by a different stored calibration factor, in accordance with (the reciprocal of) the sensitivity of the detector to each particular sample component. Rather than determining whether the unknown sample components have a retention time within a tolerance range about the respective retention times of previously run known sample components as done in the past, the present technique uses the criterion of whether any part of the unknown peak has the same time of occurrence as the center of the known sample peak. In this manner, the effective tolerance range of the respective retention times is determined by the width of the unknown sample peak, so that the tolerance range is automatically compensated in accordance with the chromatographic operating conditions and inherent characteristics of the sample component, which affect the broadening of peaks.

6 Claims, 2 Drawing Figures

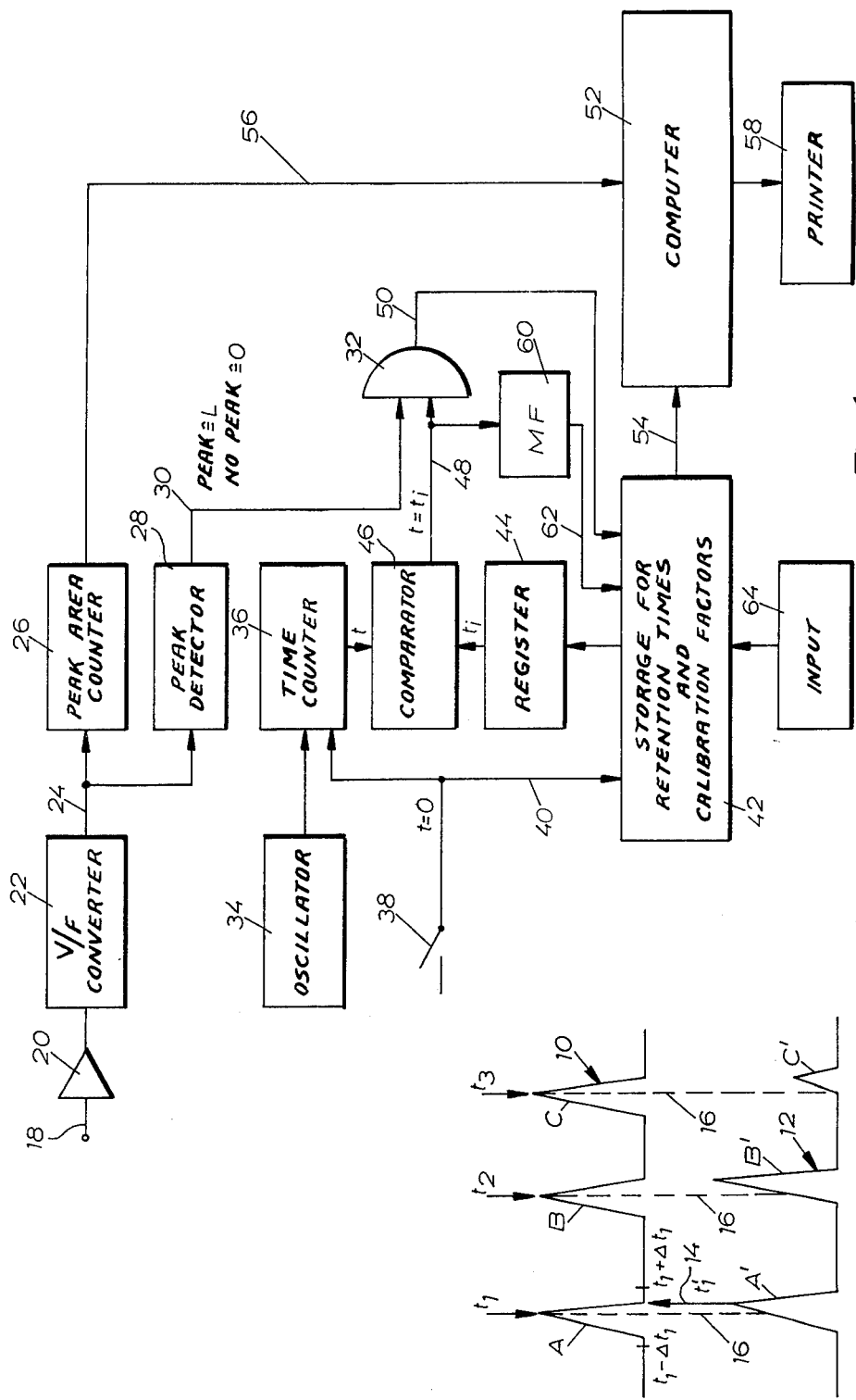

METHOD OF AND DEVICE FOR THE IDENTIFICATION AND REDUCTION OF PEAKS IN CHROMATOGRAMS

This invention relates to a method of identifying and data reduction of peaks in chromatograms, in which the peaks are integrated to form a peak area, the peaks representing different sample components are identified by means of their retention times, and the peak areas are multiplied by different stored calibration factors.

Gas chromatography is a method of analyzing mixtures. The mixture is supplied to the inlet of a separating column at a specific moment and is passed through this separating column by a carrier gas stream. The individual components of the mixture interact to different extents with a separating substance in the separating column so that they pass through the separating column at different rates and successively appear at the outlet of the separating column. A detector at the outlet of the separating column generates peak-shaped analog signals, each peak signal corresponding to the occurrence of the individual components of the sample mixture. The time integral of such a peak is proportional to the quantity of the respective particular component in the mixture, this time integral being referred to as the "peak area" hereinafter. The time from injection of the sample at the inlet of the separating column until appearance of a component at the outlet of the column is called the "retention time" of the component. This retention time is specific for a particular component; however, in addition to depending on the type of component, it also depends on the type of separating column and on the operating conditions, i.e., temperature and carrier gas flow rate. If the operating conditions are constant, it is possible to identify a component by means of the retention time. The detector at the outlet of the separating column typically responds with different sensitivity to the different components of the mixture under investigation. In order to be able to conclude from the peak area the actual quantity (concentration multiplied by time) of the respective component, it is necessary to multiply the measured peak area by a calibration factor (to "normalize" the differing detector sensitivities relative to different components).

Generally, first by means of calibration run with a known standard sample, the nominal retention times of the (desired to be measured) individual components of a mixture under given operating conditions and the detector sensitivity calibration factors associated with each of the individual components are determined. In a subsequent automatic obtaining of data reduction of chromatograms of unknown samples, in the prior art method one chooses for each sample component a retention time tolerance range, that is, a time interval about the nominal retention time. This tolerance range depends on the manner of obtaining the respective chromatogram (type of separating column and operating conditions) and on the type of the particular component. During a measuring run with an unknown sample, the peak maximum is obtained, it then being determined whether this peak maximum falls within such a tolerance range. If this is the case, the respective peak is assumed as identified as associated with the component substance which represents this tolerance range. Accordingly, the integrated peak area is multiplied by the associated stored (detector sensitivity) calibration factor, and the result is printed out in this form.

This prior art method which starts from the peak maxima of the components of the sample under investigation requires the establishment of a tolerance range for each individual component. Thus, for each component (desired to be measured) two values must be stored, and it must be determined whether the peak maximum lies between these values of retention times. This is troublesome. In each case, this required pre-judging of the appropriate length of the retention time tolerance range, whereby the danger of choosing an inappropriate length is increased.

It is an object of this invention to provide a method of identifying and reducing the data given by peaks in chromatograms, in which the establishment of retention time tolerance ranges becomes unnecessary, since such tolerance ranges result automatically from the nature of the chromatogram.

The method according to this invention is characterized by the following method steps:

a. Storage of the nominal retention times and associated (detector sensitivity) calibration factors.
b. Interrogation of the unknown sample chromatogram at the nominal retention times.
c. Multiplication of the peak area by the calibration factor associated with the nominal retention time of a sample peak (any part of which is) detected at the instant of such interrogation.

In the method according to this invention, the peak maxima in the chromatogram of the unknown samples are not the quantity started from. Rather, the peak maxima in the chromatogram of the known standard sample are started from, that is, the nominal retention times. It is determined whether at the time of occurrence of such a nominal retention time, a peak (i.e., any part of a peak) is present in the chromatogram of the unknown sample. If this is the case, this peak will be identified as the substance corresponding to the respective nominal retention time. In this manner, the tolerance range is given by the width of the respective peak (in the unknown sample chromatogram). Thus the retention time tolerance range automatically adapts both to the type of chromatogram (i.e., the operating conditions) and to the substance under analysis. It is not necessary to preset such tolerance ranges, and error possibilities connected with such pre-judging are eliminated.

The nominal retention times can possibly be gathered from a tabular compilation if standardized operating conditions are utilized; advantageously, however, the nominal retention times and detector sensitivity calibration factors are determined by a previous calibration run with a known standard sample.

The invention also relates to an apparatus for carrying out the method as hereinbefore described. The apparatus comprises chromatographic signals are supplied, a peak area counter having applied thereto the output of the voltage-to-frequency converter, a peak detector, a clock, a time counter controlled by the clock, means for storing times and calibration factors, a comparator for comparing stored times with the reading of the time counter, and a computer for multiplying peak areas from the peak area counter by calibration factors from the storage. Means are provided by which nominal retention times stored in the storage means together with the reading of the time counter, are applied to the comparator so that an interrogation of the peak detector occurs upon equality of these times. In response to the signal obtained when a peak is present during interrogation of the peak detector, a (detector sensitivity) calibration factor from the storage associated with the nominal retention time is applied to the computer to which the reading of the peak area counter is also applied as multiplier and multiplicand to obtain their product.

An illustrative embodiment of this invention will now be described more fully with reference to the accompanying drawings in which:

FIG. 1 shows a block circuit diagram of a device for carrying out the method according to the invention; and FIG. 2 shows a calibration chromatogram of a known standard "sample" and the chromatogram of a real sample being analyzed, which serves to explain the method according to the invention.

In FIG. 2 three peaks A, B and C are illustrated in a calibration (i.e., using known quantities of known components) chromatogram 10. The peak maxima are obtained at the nominal retention times $t_1$, $t_2$ and $t_3$. Therebelow, a chromatogram 12 of an unknown sample under analysis is shown with the respective peaks A', B' and C'. Due to inevitable tolerances in the operating conditions and changes in the separating column, the time course of the chromatogram 12 of the sample under analysis does not exactly coincide with the time course of the calibration chromatogram 10.

According to the prior art, a tolerance range of $t_1 - \Delta t_1$ to $t_1 + \Delta t_1$ is fixed about the instant of the nominal retention time $t_1$. The instant $t_1'$ of the peak maximum of the unknown sample peak A' in the chromatogram 12 is found, and it is determined whether this instant lies within the tolerance range. This is indicated by the arrow 14 in FIG. 2.

This invention utilizes a different technique. The nominal retention times $t_1$, $t_2$, $t_3$ . . . are stored without tolerance range. At the instant $t_1$ the chromatogram 12 is "looked at", and it is determined whether (any part of) a peak is present at this instant. This is indicated in FIG. 2 by the dotted lines 16. If peaks are determined at the instants $t_1$, $t_2$, $t_3$, these peaks A', B' C' will be considered identified and the (entire) associated peak areas are multiplied by the particular (detector sensitivity) calibration factor stored at $t_1$, $t_2$ and $t_3$, respectively.

FIG. 1 illustrates a device for carrying out this method. The detector signal from a gas chromatograph ("unknown" chromatogram 12 of FIG. 2) is applied to an input terminal 18 and is amplified by means of a preamplifier 20. Then, it is supplied to a voltage-to-frequency convertor 22, supplying at an output 24 an output frequency proportion to the (amplitude of the) applied analog input signal. This output frequency is supplied to a peak area counter or integrator 26. In addition, this output frequency is applied to a peak detector 28. The peak detector supplies a logic output signal 1 when it determines a peak is present, and an output signal 0 when no peak is determined. The output 30 of the peak detector is connected to an input of an AND-element 32.

Moreover, there is provided a clock in the form of an oscillator 34 which controls a time counter 36. By means of a starting pulse at the instant of sample injection (which is illustrated here by a switch 38), the time counter is started at the instant of sample injection; thus from this instant ($t = 0$) on the counter 36 counts time. By this starting pulse via a line 40, a storage 42 makes available the first of the stored nominal retention times, $t_1$, by transfer to register 44. By means of a comparator 46 the nominal retention time, for instance $t_1$, stored in the register 44 is compared with the actual time as represented by the content of the time counter 36. For $t = t_1$ (or in general $t = t_i$) the comparator supplies a pulse (of the 1 logic type) to an output 48 which connects to the second input of the AND-element 32. The output 50 of the AND-element 32 then supplies a pulse to the storage 42, if the peak detector 28 is signalling the presence of a peak (i.e., its output 30 is 1); output 50 causes the calibration factor corresponding to the nominal retention time ($t_1$ in this case or $t_i$ in general) to be applied to a computer 52, as is indicated by line 54. The computer is also supplied the (total) reading of the peak area counter 26 via line 56. The computer multiplies this reading of the peak area counter by the calibration factor. The result is printed out by means of a printer 58 upon occurrence of the peak end in a manner well known and, therefore, not illustrated here.

The output signal at 48 of the comparator 46 also energizes a monostable multivibrator 60. The trailing edge of the output pulse from the monostable multivibrator, effects a stepping of the storage as its control input 62, i.e. the next following nominal retention time ($t_2$ in this case and $t_i + 1$ in general) is transferred to the register 44, and the associated (detector) calibration factor is made available for supply at 54 to the computer.

The storing of the nominal retention time and (detector sensitivity) calibration factors into the storage can be effected by means of a read-in unit 64, such as a keyboard.

What is claimed is:

1. In a method for identifying and forming useful data from peaks in chromatograms, in which the peaks are integrated to form a peak area, the peaks are identified by means of their retention times and the peak areas are multiplied by stored detector sensitivity calibration factors, the improvement comprising the following method steps:
   a. storing predetermined nominal retention times and associated detector sensitivity calibration factors;
   b. interrogating the chromatogram of a sample under test at the nominal expected retention times to detect the existance of a peak; and
   c. multiplying the area of a peak detected at the instant of such interrogation by the calibration factor associated with the corresponding nominal retention time to form a product proportional to the amount of sample component causing the particular peak detected.

2. A method according to claim 1, in which:
   the nominal retention times and detector sensitivity factors are determined by a previous calibration run with a known standard sample.

3. Apparatus for identifying and forming useful data from peaks in chromatograms, comprising: a voltage-to-frequency converter to which chromatographic signals are supplied; a peak area counter having applied thereto the output of the voltage-to-frequency converter; a peak detector; a clock; a time counter controlled by the clock; storage means for storing nominal retention times and detector sensitivity calibration factors; a comparator for comparing stored nominal retention times with the reading of the time counter; a computer for multiplying peak areas from the peak area counter by the calibration factors from the storage means; means for supplying to the comparator the nominal retention times stored in the storage means together with the reading of the time counter by which an interrogation of the peak detector occurs upon equality of time; means responsive to the output of said peak detector when indicating the presence of a peak during such interrogation to activate the storage means to supply to said computer the detector sensitivity calibration factor associated with the particular nominal retention time; and means for supplying to said computer the output of the peak area counter as a multiplier so as to yield the product of the peak area multiplied by said detector sensitivity calibration factor.

4. Apparatus according to claim 3, further comprising: an AND-element; means for supplying to the AND-element the output of said comparator which becomes 1 upon equality of time, together with the output of the peak detector which is 1 when a peak is determined to be present; and means connecting the output of said AND-element to a control input of the storage means for transferring the stored calibration factor to the computer.

5. Apparatus according to claim 4, further comprising: a register connected between said storage means and said comparator; and means for transferring into said register a respective nominal retention time stored in the storage means.

6. Apparatus according to claim 5, further comprising: a monostable multivibrator connected to the output of the comparator so that the trailing edge of its signal causes transfer of the next following nominal retention time into the register and accessibility of the next associated calibration factor.

* * * * *